United States Patent [19]

Ryu

[11] Patent Number: 5,912,756
[45] Date of Patent: *Jun. 15, 1999

[54] LIGHT RECEIVING DEVICE

[75] Inventor: Shiro Ryu, Tokyo, Japan

[73] Assignee: Kokusai Denshin Denwa Kabushiki Kaisha, Tokyo, Japan

[*] Notice: This patent is subject to a terminal disclaimer.

[21] Appl. No.: 08/742,680

[22] Filed: Oct. 31, 1996

[30] Foreign Application Priority Data

Nov. 2, 1995 [JP] Japan ................. 7-308500

[51] Int. Cl.$^6$ ................................. H04B 10/02
[52] U.S. Cl. ............... 359/189; 359/160; 359/179; 359/195
[58] Field of Search ................. 359/160, 179, 359/176, 124, 161, 133, 134, 174, 337, 341, 189, 193, 195

[56] References Cited

U.S. PATENT DOCUMENTS

| | | | |
|---|---|---|---|
| 5,315,674 | 5/1994 | Asako | 385/15 |
| 5,355,248 | 10/1994 | Hedjifotiou | 359/341 |
| 5,485,299 | 1/1996 | Jones | 359/179 |
| 5,542,011 | 7/1996 | Robinson | 385/24 |
| 5,572,356 | 11/1996 | Yoshida et al. | 359/341 |
| 5,793,512 | 8/1998 | Ryu | 359/160 |

*Primary Examiner*—Edward Lefkowitz
*Attorney, Agent, or Firm*—Pollock, Vande Sande & Amernick

[57] ABSTRACT

To enable the filtering of a light signal without using an optical bandpass filter, the present invention provides the following construction: a light signal transmitted through an optical fiber enters an injection-locked laser device which is locked to the wavelength of the light signal to oscillate synchronously with the light signal; the locked light signal enters a light frequency discriminator to transform the frequency-modulated signal into an intensity modulated signal, and it enters a light receiver to be demodulated. Since the injection-locked laser device emits only a locked oscillation light signal, the received light signal can be extracted without using an optical bandpass filter.

20 Claims, 6 Drawing Sheets

WAVELENGTH-MULTIPLEXED INPUT LIGHT
(WAVELENGTH SPACING 0.4 nm)

FIG. 5

EMITTED LIGHT OF INJECTION-LOCKED LASER

PRIOR ART

FIG. 9

PRIOR ART

LIGHT RECEIVING DEVICE

BACKGROUND OF THE INVENTION

1. Field of the Invention

The present invention relates to a light receiving device for an optical communication system, more specifically, to a light receiving device suitable for use in a wavelength-division multiplexed optical communication system.

2. Description of the Related Art

Figure 8:
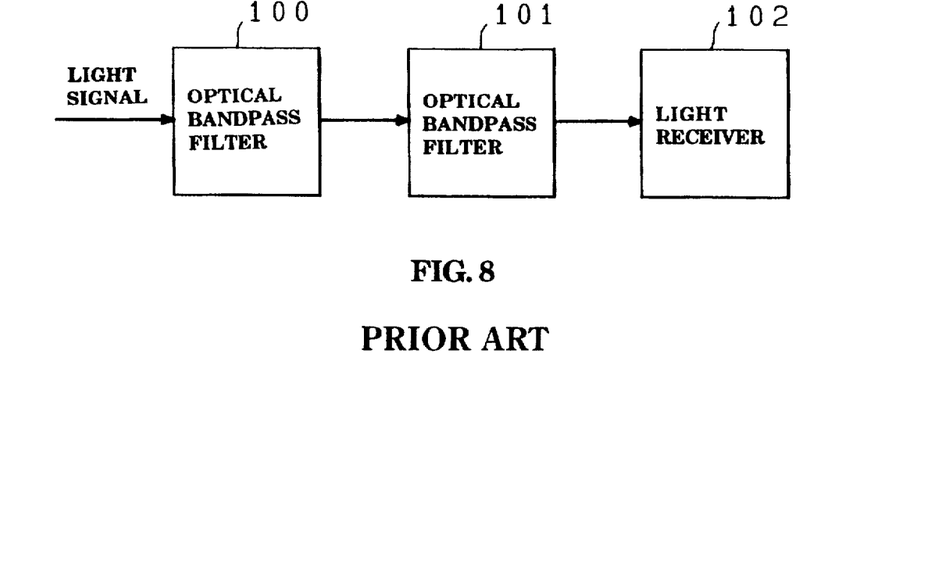
FIG. 8 is a block diagram showing a construction of a conventional light receiving device.

FIG. 8 is a block diagram of a light receiving device for use in the conventional optical communication system.

In this light receiving device, a light signal transmitted through an optical fiber enters an optical bandpass filter 100, and is filtered by the filtering characteristics of the optical bandpass filter 100. Further, the light signal passed through the optical bandpass filter 100 enters an optical bandpass filter 101, and is filtered by the filtering characteristics of the optical bandpass filter 101.

Thus, the light signal is filtered by the optical bandpass filters 100, 101 into a signal with only a specific bandwidth, and the signal enters a light receiver 102 to be demodulated into a modulation signal.

Furthermore, the reason that the optical bandpass filters 100 and 101 are cascaded is as follows.

To realize a high-capacity communication by the optical communication system, there is a wavelength-division multiplexed optical communication system proposed. In such a system, the wavelength dependence of gain of an amplifier used in repeaters produces the difference in signal intensity between wavelengths. To suppress this influence and to reduce the difference of waveform distortion in wavelengths by chromatic dispersion in an optical fiber transmission line, it is necessary to narrow spacing between wavelengths (channel spacing) as much as possible.

However, it is generally said that a feasible full width at half maximum of the optical bandpass filter is about 1 nm (about 0.5 nm even for a special experiment purpose). Therefore, to narrow spacing between wavelengths will lead to impossibility of separating a desired wavelength (channel) signal from the wavelength-division multiplexed signal. Thus, cascading optical bandpass filters and thereby narrowing the overall passband of wavelengths makes it is possible to separate the desired wavelength (channel) signal from the wavelength-division multiplexed signal with wavelength spacing narrowed. There are the following problems on a conventional light receiving device in which the optical bandpass filters are cascaded.

1. To narrow the effective passband of a multi-stage cascaded optical bandpass filters the center wavelengths of the optical bandpass filters must all be strictly at the same wavelength. This is a very difficult adjustment to make.

2. If there is a minute change in the properties of the optical bandpass filters due to a change in external environments such as temperature, the center wavelengths of the filters drift so that the filters cannot satisfy the desired bandpass characteristics.

3. Furthermore, to interpose an optical bandpass filter attenuates received signal and reduces the possible transmission distance for the optical communication system. Cascading optical bandpass filters further increases the attenuation of the received signals, with the result that the possible transmission distance of the optical communication system is increasingly reduced.

4. Furthermore, when a frequency modulated or phase modulated light enters an optical bandpass filter, the intensity noise components contained in the foregoing modulated light cannot be removed at the optical fiber output due to absence of the optical limiter function.

5. Moreover, if the optical bandpass filters are designed to be cascaded, the shortest wavelength spacing of the multiplexed signals is about 1 mm, and to arrange the wavelengths closer is almost impossible.

Figure 9:
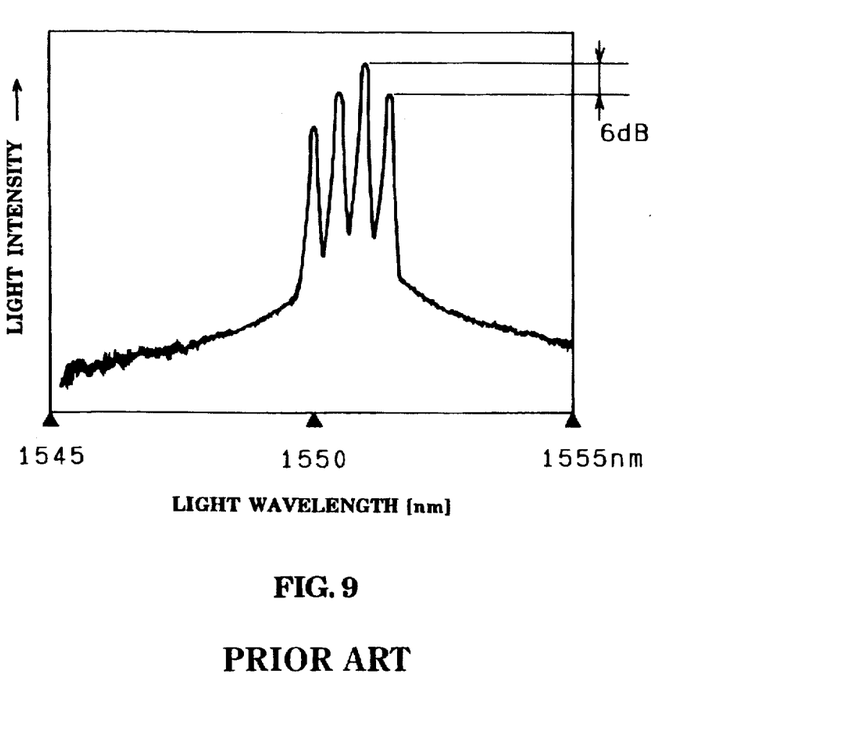
FIG. 9 is an example of a spectrum of the light signal filtered in the conventional light receiving device.

By way of an example, FIG. 9 shows a spectrum when a light of four wavelengths multiplexed with a wavelength spacing of 0.5 nm passes through a filter in which optical bandpass filters having full width at half maximums of 0.5 nm and 3 nm are cascaded (Technical Report of IEICE optical communication system, OCS94-47 P.33–38 "Transmission experiment on high-density wavelength-division multiplexed systems combined with polarization multiplexing" INSTITUTE OF ELECTRONICS, INFORMATION and COMMUNICATION ENGINEERS, 1994–10). From this FIG. 9, compared to the light intensity of the wavelength (channel) to be extracted located at the second from the right end, the light intensity of the adjacent channel can be observed to be attenuated by only a only 6 dB. If is clearly seen that extracting the desired one without being interfered by the adjacent chancel is totally difficult.

A method to overcome this kind of problem is proposed in the aforementioned Technical Report of IEICE. According to this method, additional constructions such as one for forming an orthogonal polarization and one for separating polarized waves are required. Furthermore, even if this method is adopted, the improvement of crosstalk was only about 6.5 dB, and the attenuation of light intensity of the interfering channel was only about 12.5 dB.

SUMMARY OF THE INVENTION

The present invention has been made in view of the foregoing problems, and an object of the present invention is to provide a light receiving device that reliably filters light signals without using an optical bandpass filter or orthogonal polarization.

In order to accomplish the aforementioned object, according to one aspect of the invention, a light receiving device comprises an injection-locked laser device that oscillates to be locked at a frequency of a receiving light signal, and a light receiver that demodulates a locked oscillation output transmitted from the injection-locked laser device; and the foregoing injection-locked laser device filters the receiving light signal.

According to another aspect of the invention, a control means for controlling a free-running frequency of the injection-locked laser device is added to the foregoing light receiving device.

According to another aspect of the invention, the receiving light signal is modulated in frequency by a modulation signal.

According to another aspect of the invention, the foregoing light receiver further comprises a light frequency discriminator and a direct detection light receiver disposed at the post-stage thereof.

According to another aspect of the invention, the received light signal is modulated in phase by a modulation signal.

In the preferred construction, the foregoing light receiver may comprise a light phase discriminator and a direct detection light receiver disposed at the post-stage thereof.

In the alternative, the receiving light signal may be a wavelength-division multiplexed light signal.

According to the foregoing construction of the invention, an optical bandpass filter is not used, and no insertion loss is produced by the filter. Furthermore, the receiving light signal is filtered by the injection-locked laser device, and the signal can be amplified and the intensity noise can be removed, therefore the degradation of receiver sensitivity in suppressed.

Furthermore, since the frequency locking range of the injection-locked laser device is about 10 GHz, the passband can be made sufficiently narrower (about 0.8 nm in the wavelength band of 1.55 mm) than the optical bandpass filter. Thus, interference by an adjacent channel carrier can be avoided, and the wavelength-division multiplexed optical communication system can be realized in which the wavelength of light signals are arranged in close spacing.

BRIEF DESCRIPTION OF THE DRAWINGS

The present invention will be fully understood from the detailed description given below and from the accompanying drawings of the preferred embodiments of the invention, which, however, should not be taken to limit the specific embodiment, but are for explanation and understanding, in which.

DESCRIPTION OF THE PREFERRED EMBODIMENT

Figure 1:
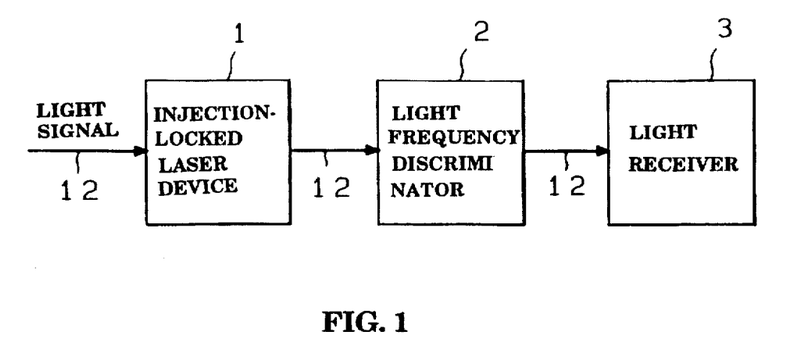
FIG. 1 is a block diagram showing a construction of the first embodiment of a light receiving device according to the present invention.

FIG. 1 shows a construction of the first embodiment of the light receiving device according to the present invention, and this embodiment assumes that a light signal modulated in frequency enters.

In FIG. 1, an injection-locked laser device 1 oscillates to be locked in the wavelength of the light signal transmitted through an optical fiber 12. The locked oscillation output transmitted from the injection-locked laser device 1 enters a light frequency discriminator 2 to demodulate the light signal modulated in frequency. The light signal demodulated by the light frequency discriminator 2 is directly detected and transformed into an electric signal by an opto-electric transforming means such as a photo-diode in a light receiver 3; thus a modulation signal is reproduced.

When a light modulated in frequency or phase enters the injection-locked laser device 1, if the frequency of the received light signal is close to the free-running frequency of the injection-locked laser device 1 and the amplitude is large to a certain extent, the injection-locked laser device 1 gives a light output oscillating to be locked to the received light signal. In this case, the light output preserves the phase of the received light signal and is amplified to a certain level of light intensity.

That is, when a light signal is modulated in frequency, the light receiving device used may be constructed by combining the injection-locked laser device 1, the light frequency discriminator 2 for demodulating a frequency-modulated signal disposed at the post-stage of the injection-locked laser device 1, and the light receiver 3 for detecting the light signal and transforming it into an electric signal.

Furthermore, when a light signal is modulated in phase, the light receiving device used may be constructed by combining the injection-locked laser device 1, a light phase discriminator 2' (described hereinafter with reference to FIG. 2) for demodulating a phase-demodulated signal disposed at the post-stage of the injection-locked laser device 1, and the light receiver 3 for detecting the light signal and transforming it into an electric signal.

The free-running frequency of the injection-locked laser device 1 can be varied by adjusting the operation temperature and drive current of the injection-locked laser device 1, and the free-running frequency of the injection-locked laser device 1 is made to be adjusted by this varying means to a frequency close to the frequency of a light signal.

When a wavelength-division multiplexed light signal enters the light receiving device as a light signal, the light receiving device is designed to receive one channel of the wavelength-division multiplexed channels. That is, the light receiving device is set to oscillate at a light carrier frequency of a desired channel or a neighboring frequency. When a wavelength-division multiplexed light signal enter the injection-locked laser device 1, the injection-locked laser device 1 is locked only to the desired carrier and oscillates synchronously with the carrier frequency; thus the locked oscillation output of the desired carrier frequency is obtained. In this case, the other channel carriers are sufficiently attenuated at the output of the injection-locked laser device 1.

Figure 5:
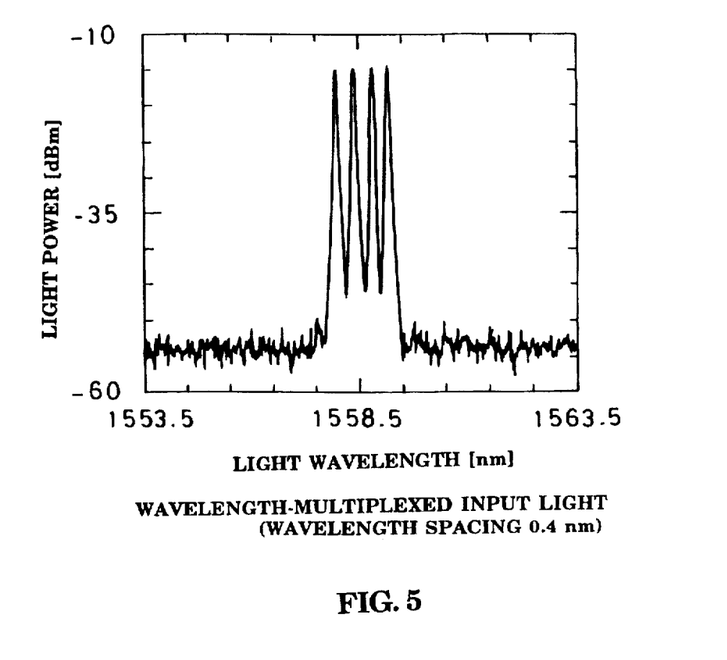
FIG. 5 is an example of a spectrum of a light signal with four wavelengths multiplexed.
Figure 6:
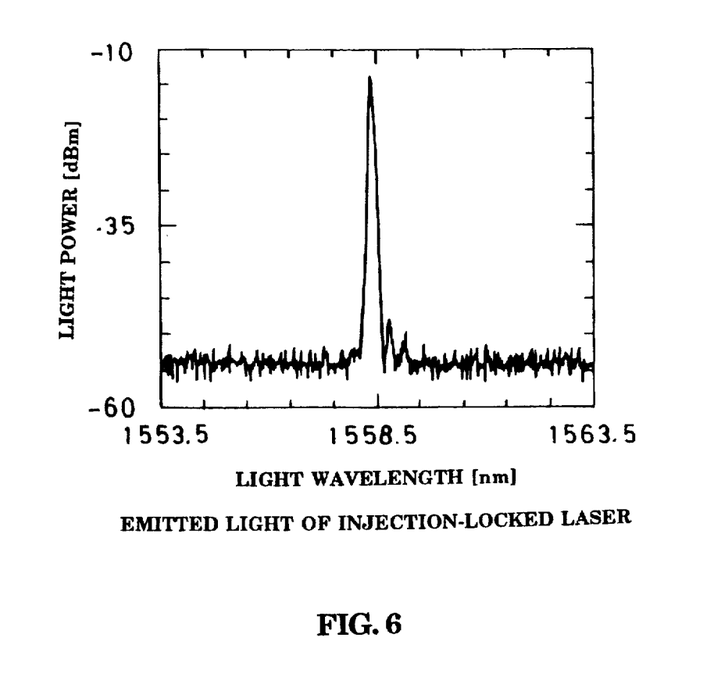
FIG. 6 is an example of a spectrum of the light signal filtered in the light receiving device of the invention.

When a wavelength-division multiplexed light signal of four waves with a light spectrum multiplexed in 0.4 nm spacing as shown in FIG. 5 is received, assuming that the injection-locked laser device 1 is adjusted to be locked to the channel carrier of the second from left, the injection-locked laser device 1 gives a light output as shown in FIG. 6.

From FIG. 6 is observed a good suppression ratio that the light power of an adjacent channel carrier is attenuated by more than 30 dB to a extracted channel carrier. This shows that the adjacent channel carrier is sufficiently filtered not to give interference to the others.

Moreover, in the light receiving device of the invention shown in FIG. 1, when a light signal of a single wavelength other than the wavelength-division multiplexed is received, the injection-locked laser device 1 gives a constant light output; and it has a function to remove added intensity noises and to amplify light.

Figure 3:
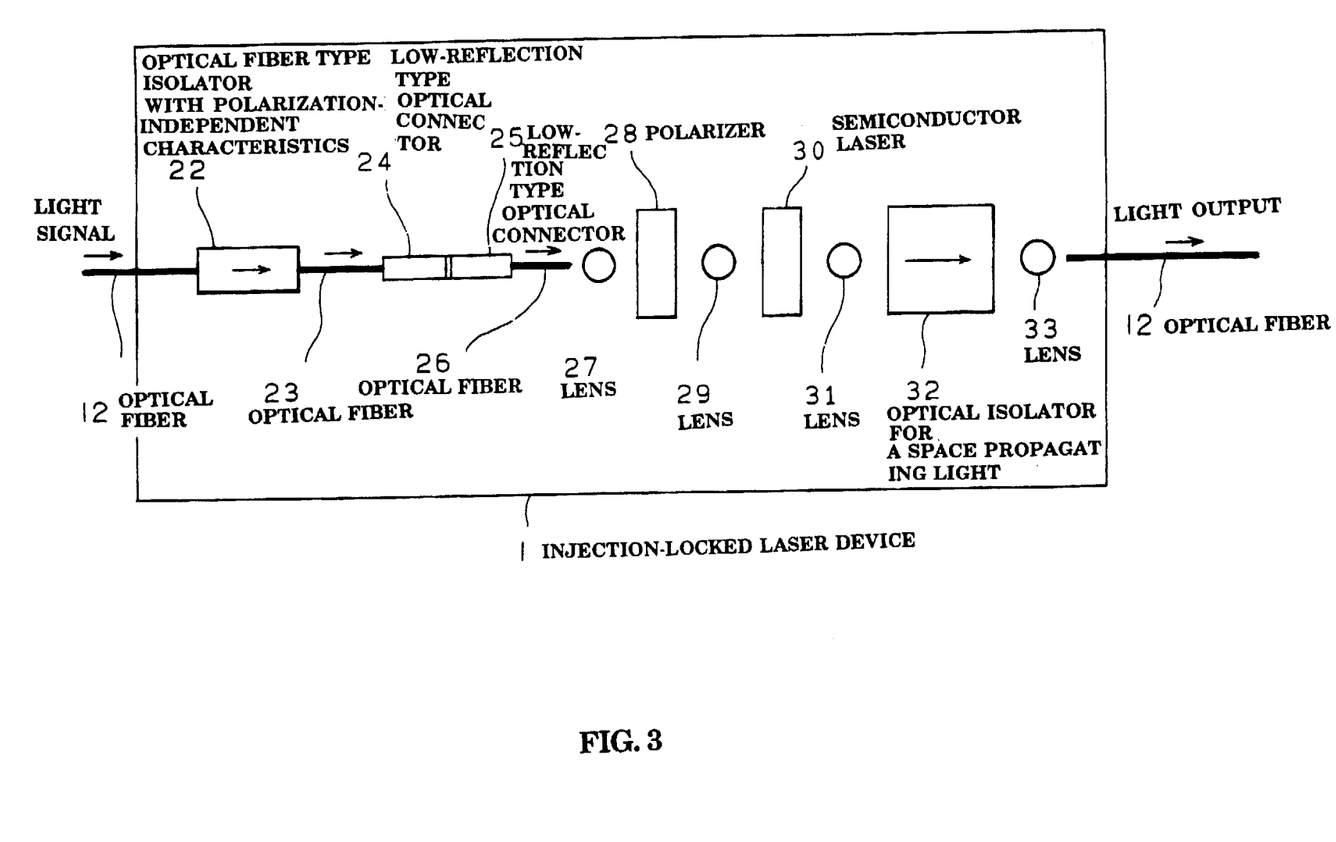
FIG. 3 is an illustration showing a construction of an injection-locked laser device in the light receiving device of the invention.

FIG. 3 illustrates one example of a construction of the injection-locked laser device 1 shown in FIG. 1.

In the injection-locked laser device 1 shown in FIG. 3, the light signal transmitted through the optical fiber 12 enters an optical fiber type isolator 22 with polarization-independent characteristics, and passes through the isolator 22; the passes through low-reflection type optical connectors 24, 25 and an optical fiber 26, and is transformed into parallel rays by a lens 27. The propagating light transformed into parallel rays passes through a polarizer 29 disposed so as to transform the polarization of light entering a semiconductor laser 30 into horizontal polarization (TE wave); and thereafter, the parallel rays are focused by a lens 29 at the semiconductor laser 30.

Since the wavelength of the free-running frequency of the semiconductor laser 30 is set close to a wavelength of an incoming light signal, the semiconductor laser 30 is locked to the light signal and emits a laser light locked therein. Thus, the semiconductor laser 30 emits an amplified light that has an identical wavelength and phase to the light signal. The amplified light is emitted from both sides of the semiconductor laser 30. The light emitted from one side of the laser 30 enters an optical isolator 32 for a space propagating light through a lens 31; and, the light is focused by a lens 33 to be launched into the optical fiber 12, and is transmitted, for example, to the following frequency discriminator 2.

On the other hand, the laser light emitted from the opposite side of laser 30 toward the input transmits through the lens 29, polarizer 28, lens 27, optical fiber 26, low-reflection type optical connectors 25, 24, and the optical fiber 23; and enters the optical fiber type isolator 22 with polarization-independent characteristics. However, the isolator 22 does not transmit light toward the optical fiber 12, and the amplified light is not given to optical fiber 12.

When the alignment of the lens 27, polarizer 28, and lens 29 are performed to integrate them into the injection-locked laser device 1, the following processes are only needed to be done; the low-reflection type optical connector 25 is detached from the low-reflection type optical connector 24; the semiconductor laser 30 is made active; and the foregoing optical components are aligned so as to make the light power maximum by observing the light emitted from the semiconductor laser 30 toward the input through the low-reflection optical connector 25. Therefore, the injection of light into the semiconductor laser 30 can be done efficiently.

Furthermore, using the polarizer 28 regulates the polarization of incoming light at the semiconductor laser 30 into horizontal polarization (TE wave), thereby obstructing the vertically polarized waves and the semiconductor laser 30 can stably be operated.

Figure 4:
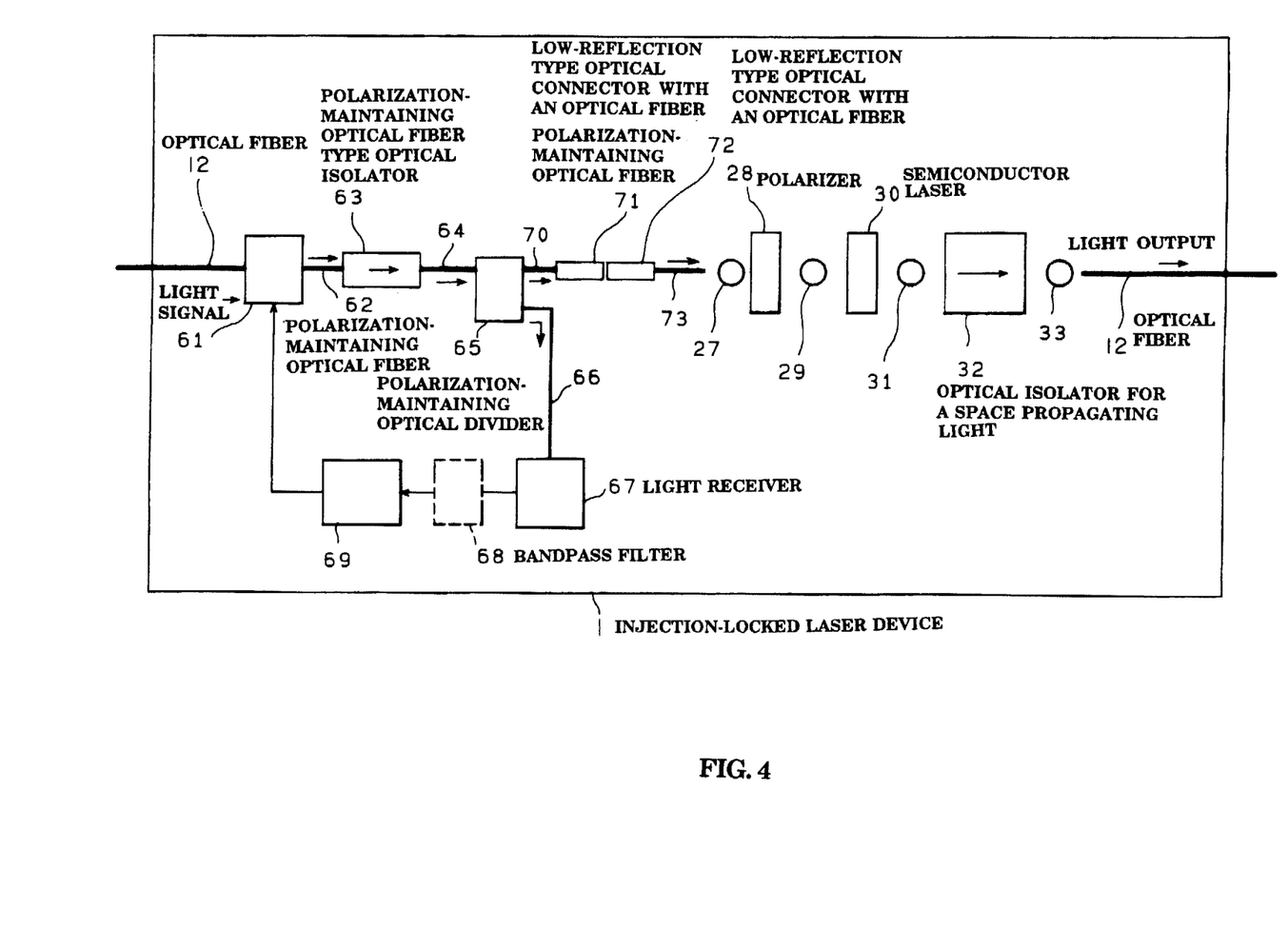
FIG. 4 is an illustration showing another construction of the injection-locked laser device in the light receiving device of the invention.

Next, FIG. 4 shows another construction of the injection-locked laser device 1, and the parts identical to those in FIG. 3 are given the same symbols and their description will be omitted.

In the injection-locked laser device 1 constructed as shown in FIG. 4, a light signal transmitted through the optical fiber 12 enters a polarization controller 61 so that the polarization direction is regulated to the horizontal. The light signal enters a polarization-maintaining optical fiber type optical isolator 63 via a polarization-maintaining optical fiber 62 and passes therethrough; further, via a polarization-maintaining optical fiber 64, the light signal branches a pair of the light in which the polarization direction is preserved in the horizontal plane by a polarization-maintaining optical divider 65. The branched light is received by a light receiver 67 via a polarization-maintaining optical fiber 66 and the intensity of the light is monitored. Thereafter, a control circuit 69 controls the polarization controller 61 so as to maximize the intensity of the light.

The light that is not branched by the polarization-maintaining optical branch 65 passes through a polarization-maintaining optical fiber 70, low-reflection type optical connectors 71, 72 with a polarization-maintaining optical fiber, and a polarization-maintaining optical fiber 73, and is transformed into parallel rays by the lens 27. The propagating light that is transformed into parallel rays and holds the horizontal polarization plane is transmitted through the polarizer 28 disposed so as to pass the horizontally polarized wave. Thereafter, the light is focused by the lens 29 at the semiconductor laser 30. Thereby, the semiconductor laser 30 performs an injection-locked oscillation.

In this example, optical components and optical fibers of polarization-maintaining type are used on the input path of the semiconductor laser 30, and an incoming light can maintain the polarization state stably and is injected into the semiconductor laser 30. Therefore, in addition to the function and effect that the injection-locked laser device shown in FIG. 3 displays, this injection-locked laser device 1 makes it is possible to enter a horizontally polarized light of a sufficient intensity stably into the semiconductor laser 30, and secures a stable operation.

Although, in this example, the polarization-maintaining optical fiber type optical isolator 63 is disposed at the pre-stage of the polarization-maintaining optical divider 65, it is possible to achieve a similar effect by interchanging the order of the two, i.e., disposing the polarization-maintaining optical fiber type optical isolator 63 at the post-stage of the polarization-maintaining optical divider 65.

Furthermore, when each of wavelengths of a wavelength-division multiplexed light signal via the optical fiber 12 is slightly modulated in amplitude by each inherent single frequency an electrical bandpass filter 68 shown in a dotted line that has an identical center frequency to the one applied to a desired light signal of the wavelength-division multiplexed light signal is interposed after the light receiver 67. Thus, when the wavelength-division multiplexed light signal enters the injection-locked laser device 1, the polarization controlling operation can be worked only on the light signal of a desired wavelength by the polarization controller 61.

Figure 2:
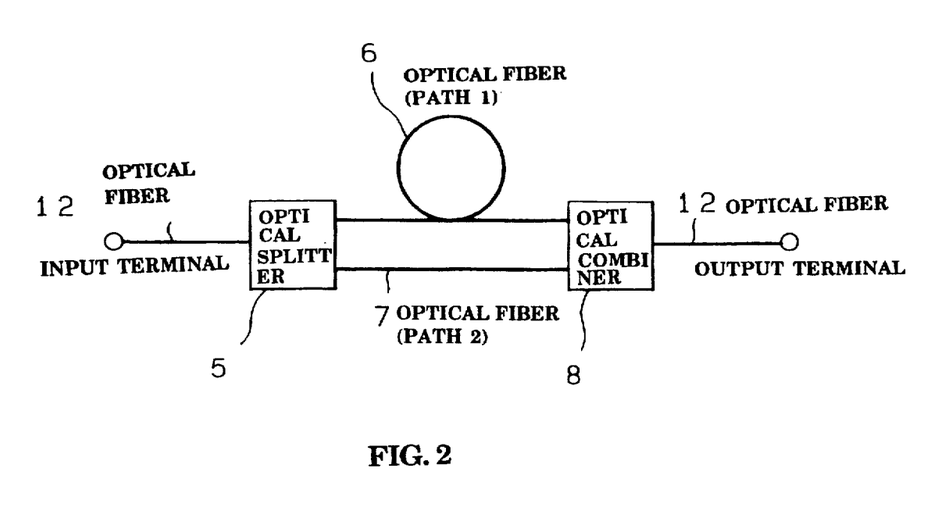
FIG. 2 is an illustration showing a construction of a light frequency discriminator in the light receiving device of the invention.

FIG. 2 shows a construction of the light frequency discriminator 2, which will be described with reference to this figure.

The light frequency discriminator shown in FIG. 2 is called a Mach-Zehnder light frequency discriminator. A frequency modulated light signal enters the optical fiber 12 from an input terminal and is split into two by an optical divider 5. One of the split light signals is transmitted through a path 1 formed of an optical fiber 6 to enter an optical combiner 8. The other split light signal is transmitted through a path 2 formed of an optical fiber 7 to enter the optical combiner.

The length of the path 1 is made longer that that of the path 2, and the light signals transmitted through the path 1 and 2 of each different length are multiplexed by the optical combiner 8. Thereby, the frequency-modulated light signal is demodulated to be fed from an output terminal.

The difference in length between the path 1 and 2 is set such that the transmission time difference through the paths is equal to a time difference corresponding to the frequency deviation of frequency-modulated light signal.

Furthermore, in the Mach-Zehnder light frequency discriminator shown in FIG. 2, if the difference in length between the paths 1 and 2 is set such that the transmission time difference through the paths is equal to a time difference corresponding to the phase deviation of phase-modulated light signal, a phase-modulated light signal can be demodulated. That is, redesigning the difference in length between the patents 1 and 2 of the Mach-Zehnder light frequency discriminator shown in FIG. 2 will produce a light phase discriminator 2.

Although, in the Mach-Zehnder light frequency discriminator shown in FIG. 2, the paths 1 and 2 are constructed by the optical fiber 6 and 7, they may be constructed by optical waveguides instead of the optical fibers 6, 7.

Figure 7:
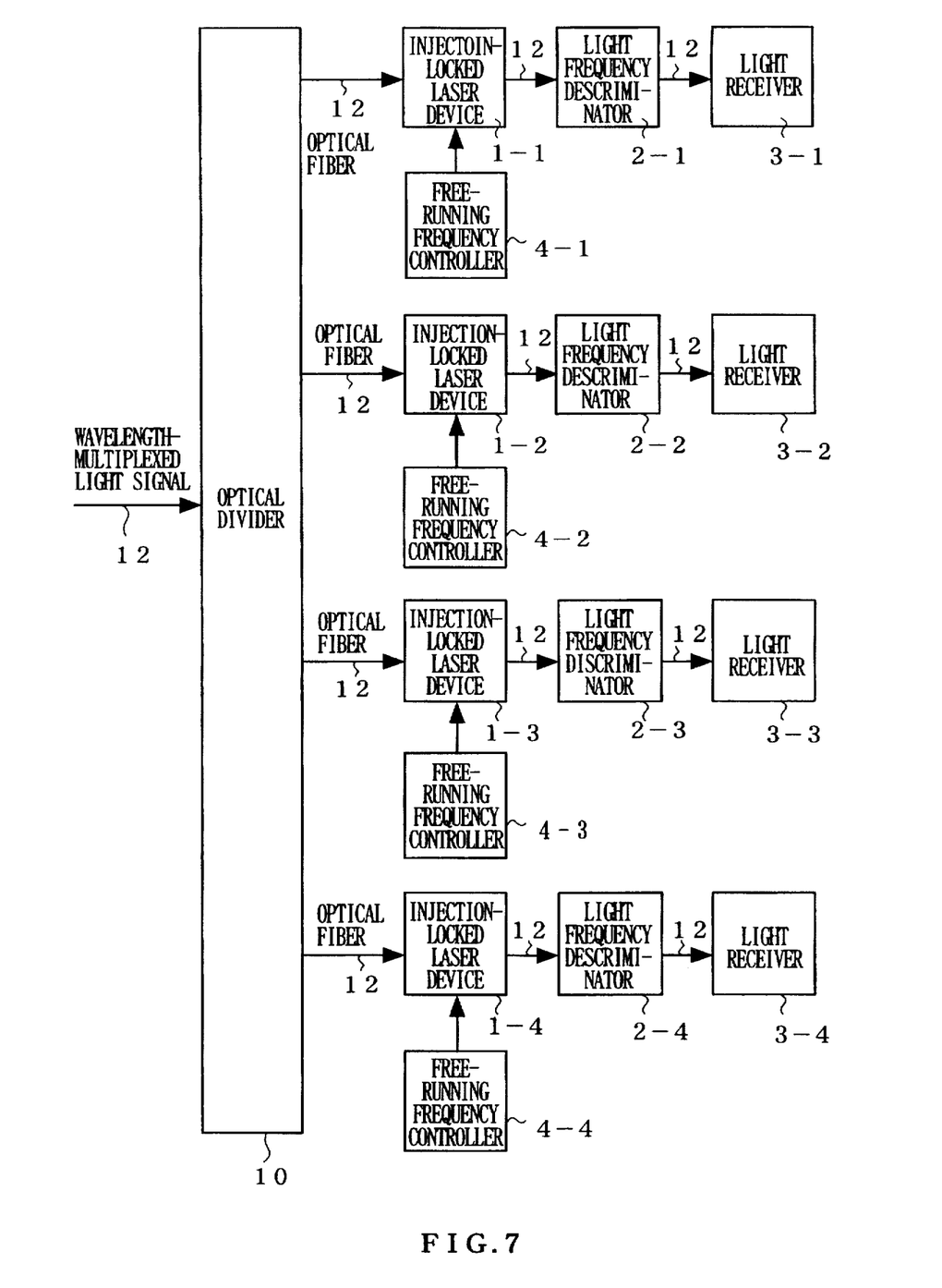
FIG. 7 is a block diagram showing a construction of the second embodiment of the light receiving device according to the invention.

Next, FIG. 7 illustrates a construction of the second embodiment according to the present invention, in which a wavelength-division multiplexed light signal entered is designed to be received by splitting the input light signal into each of a plurality of channels.

The light receiving device shown in FIG. 7 is designed to receive a wavelength-division multiplexed light signal in which each wavelength is modulated in frequency, and the wavelength-division multiplexed light signal received through the optical fiber 12 is split into the number of multiplexed wavelengths by an optical divider 10. In this case, four wavelengths are multiplexed, and the wavelength-division multiplexed light signal is split into four channels by the optical divider 10. The wavelength-division multiplexed light signals split into four channels respectively enter injection-locked laser devices 1-1, 1-2, 1-3, and 1-4.

The injection-locked laser devices 1-1, 1-2, 1-3, and 1-4 are respectively designed to oscillate and to be locked to the wavelength of any one channel of the wavelength-division multiplexed light signal received. The injection-locked oscillation output emitted from each injection-locked laser device 1-1, 1-2, 1-3, and 1-4 respectively enters a light frequency discriminator 1-2, 2-2, 2-3, and 2-4. In this case, as described above, only the carrier of oscillating channel in injection locking is filtered to the output from each of the injection-locked laser device 1-1, 1-2, 1-3, and 1-4. Namely, the light signal of the 1-channel is emitted from the injection-locked laser device 1-1, the light signal of the 2-channel is emitted from the injection-locked laser device 1-2, the light signal of the 3-channel is emitted from the injection-locked laser device 1-3, and the light signal of the 4-channel is emitted from the injection-locked laser device 1-4.

Thus, the light signal split into each channel enters a light frequency discriminator 2-1, 2-2, 2-3, and 2-4 so that the light signal modulated in frequency is demodulated. The light signal of each channel demodulated by the light frequency discriminator 2-1, 2-2, 2-3, and 2-4 is directly detected and transformed into an electric signal by an opto-electric transforming means such as a photodiode in a light receiver 3-1, 3-2, 3-3, and 3-4; thus a modulation signal of each channel is reproduced.

As described above, when a light signal modulated in frequency or phase enters the injection-locked laser device 1-1, 1-2, 1-3, and 1-4, if the frequency of the received light signal is close to the free-running frequency of the respective injection-locked laser device and the amplitude is large to a certain extent, and injection-locked laser device 1-1, 1-2, 1-3, and 1-4 produces a light output signal that is locked in and oscillates synchronously with the received light signal. This outgoing light signal preserves the phase of the incoming light signal and is amplified to a certain level of light intensity.

FIG. 7 shows a case that the wavelength-division multiplexed light signal is modulated in frequency, and the frequency of outgoing light oscillated in injection locking becomes identical to the frequency of the incoming light. Therefore, the light receiving device may be used which is constructed by combining the injection-locked laser devices 1-1, 1-2, 1-3, and 1-4; the light frequency discriminators 2-1, 2-2, 2-3, and 2-4 for demodulating a frequency-modulated signal disposed at the post-stage of the injection-locked laser device 1-1, 1-2, 1-3, and 1-4; and the light receives 3-1, 3-2, 3-3, and 3-4 for detecting the light signal and transforming it into an electric signal.

Furthermore, when a light signal modulated in phase is used, the light receiving device may be used which is constructed by combining the injection-locked laser devices 1-1, 1-2, 1-3, and 1-4; the light phase discriminators 2-1, 2-2, 2-3, and 2-4 for demodulating a phase-demodulated signal disposed at the post-stage of the injection-locked laser device 1-1, 1-2, 1-3, and 1-4; and the light receivers 3-1, 3-2, 3-3, and 3-4 for detecting the light signal and transforming it into an electric signal.

The free-running frequency of the injection-locked laser devices 1-1, 1-2, 1-3, and 1-4 are designed to be the frequency of a desired channel carrier to be filtered or the frequency adjacent to that, whereby free-running frequency controllers 4-1, 4-2, 4-3, and 4-4 respectively control the operating temperature and drive current of the injection-locked laser devices 1-1, 1-2, 1-3, and 1-4.

Furthermore, varying the operating temperature and drive current of the injection-locked laser devices 1-1, 1-2, 1-3, and 1-4 by the free-running frequency controllers 4-1, 4-2, 4-3, and 4-4 can control the free-running frequency so as to easily oscillate in injection locking at a frequency of the other channel.

The injection-locked laser devices 1-1, 1-2, 1-3, and 1-4 have a frequency locking range of about 10 GHz. Since 10 GHz is equivalent to about 0.08 mm in the 1.55 mm band, the spacing of wavelengths to be wavelength-division multiplexed can be made very close to about one tenth of the conventional system.

When a wavelength-division multiplexed light signal of four waves having a spectrum at the adjacency of 1558.5 nm with 0.4 nm spacing as shown in FIG. 5 is entered, if the injection-locked laser device 1-2 is aligned so as to be locked in by the free-running frequency controller 4-2, the injection-laser device 1-2 will emit light as shown in FIG. 6.

From FIG. 6 is observed a good suppression ratio that the light power of the first and third channel carrier adjacent to the second are attenuated by more than 30 dB to the second channel carriers to be extracted. This shows that the adjacent channel carriers are sufficiently filtered not to give interference to the desired channel.

Furthermore, the injection-locked laser devices 1-2, 1-2, 1-3, and 1-4 give a constant light output, and they function to remove added intensity noises and to amplify incoming light.

Moreover, the construction shown in FIG. 3 or 4 can be applied to the injection-locked laser devices 1-1, 1-2, 1-3, and 1-4, the construction shown in FIG. 2 can be applied to the light frequency discriminators 2-1, 2-2, 2-3, and 2-4 or the light phase discriminators 2'-1, 2'-2, 2'-3, and 2'-4.

As described hereinabove, the light receiving device according to the present invention uses an injection-locked laser device for filtering instead of using an optical bandpass filter, and it exerts the following effects:

1. Since the free-running frequency of the injection-locked laser device can easily be adjusted by regulating the operating temperature and drive current of the injection-locked laser device, setting the frequency to a desired frequency can easily be done;

2. When a frequency-modulated or phase-modulated light enters an optical bandpass filter, intensity noise components contained in the modulated light cannot be removed, however the intensity noise components can be removed sufficiently in the injection-locked laser device, and the degradation in receiver sensitivity seen in the conventional technology can be prevented;

3. Since the injection-locked laser device also functions to amplify an input light signal, it can prevent reduction of possible transmission distance by the attenuation of light signals due to the insertion of an optical bandpass filter, which is subject to the conventional technology.

4. Since the frequency locking range of the injection-locked laser device is generally about 10 GHz (about 0.08 nm in wavelength 1.55 mm band) close to the free-running frequency, a sufficiently narrow passband can be obtained compared to the optical bandpass filter, and a wavelength-division multiplexed optical communication system in which a light signal is disposed with a close spacing in wavelengths can be achieved without interference from the adjacent carriers.

While the specific embodiments of the present invention have been illustrated and described herein, it is realized that numerous modifications and changes will occur to those skilled in the art. It is therefore to be understood that the appended claims are intended to cover all such modifications and changes as fall within the true spirit and scope of the invention.

What is claimed is:

1. A light receiving device comprising:
   an injection-locked laser device that oscillates to be locked to a frequency of a received light signal; and
   a light receiver that demodulates a locked oscillation output transmitted from the injection-locked laser device;
   wherein the injection-locked laser device filters the received light signal.

2. A light receiving device as claimed in claim 1, wherein a control means for controlling a free-running frequency of the injection-locked laser device as added.

3. A light receiving device as claimed in claim 1, wherein the received light signal is modulated in frequency by a modulation signal.

4. A light receiving device as claimed in claim 2, wherein the received light signal is modulated in frequency by a modulation signal.

5. A light receiving device as claimed in claim 3, wherein the light receiver further comprises a light frequency discriminator and a direct detection light receiver disposed at the post-stage thereof.

6. A light receiving device as claimed in claim 4, wherein the light receiver further comprises a light frequency discriminator and a direct detection light receiver disposed at the post-stage thereof.

7. A light receiving device as claimed in claim 1, wherein the received light signal is modulated in phase by a modulation signal.

8. A light receiving device as claimed in claim 2, wherein the received light signal is modulated in phase by a modulation signal.

9. A light receiving device as claimed in claim 7, wherein the light receiver further comprises a light phase discriminator and a direct detection light receiver disposed at the post-stage thereof.

10. A light receiving device as claimed in claim 8, wherein the light receiver further comprises a light phase discriminator and a direct detection light receiver disposed at the post-stage thereof.

11. A light receiving device as claimed in claim 1, wherein the received light signal is a wavelength-division multiplexed light signal.

12. A light receiving device as claimed in claim 2, wherein the received light signal is a wavelength-division multiplexed light signal.

13. A light receiving device as claimed in claim 3, wherein the received light signal is a wavelength-division multiplexed light signal.

14. A light receiving device as claimed in claim 4, wherein the received light signal is a wavelength-division multiplexed light signal.

15. A light receiving device as claimed in claim 5, wherein the received light signal is a wavelength-division multiplexed light signal.

16. A light receiving device as claimed in claim 6, wherein the received light signal is a wavelength-division multiplexed light signal.

17. A light receiving device as claimed in claim 7, wherein the received light signal is a wavelength-division multiplexed light signal.

18. A light receiving device as claimed in claim 8, wherein the received light signal is a wavelength-division multiplexed light signal.

19. A light receiving device as claimed in claim 9, wherein the received light signal is a wavelength-division multiplexed light signal.

20. A light receiving device as claimed in claim 10, wherein the received light signal is a wavelength-division multiplexed light signal.

* * * * *